(12) United States Patent
Larry et al.

(10) Patent No.: US 12,532,079 B2
(45) Date of Patent: Jan. 20, 2026

(54) VEHICLE DISPLAY SYSTEM

(71) Applicant: Ford Global Technologies, LLC, Dearborn, MI (US)

(72) Inventors: Mark Larry, Macomb, MI (US); Biaohe Guo, Northville, MI (US); Martin van Hoeckel, Woodstock (CA); Jonathan Diedrich, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 18/525,947

(22) Filed: Dec. 1, 2023

(65) Prior Publication Data

US 2025/0184614 A1   Jun. 5, 2025

(51) Int. Cl.
| | |
|---|---|
| *H04N 23/74* | (2023.01) |
| *B60K 35/22* | (2024.01) |
| *B60K 35/81* | (2024.01) |
| *G06V 20/59* | (2022.01) |
| *H04N 23/11* | (2023.01) |
| *H04N 23/71* | (2023.01) |

(52) U.S. Cl.
CPC ............. *H04N 23/74* (2023.01); *B60K 35/22* (2024.01); *B60K 35/81* (2024.01); *H04N 23/11* (2023.01); *H04N 23/71* (2023.01); *B60K 2360/332* (2024.01); *G06V 20/59* (2022.01)

(58) Field of Classification Search
CPC ........ H04N 23/74; H04N 23/71; H04N 23/11; B60K 35/81; B60K 35/22; B60K 2360/332; G06V 20/59
USPC .......................................................... 348/77
See application file for complete search history.

(56) References Cited

U.S. PATENT DOCUMENTS

| | | | |
|---|---|---|---|
| 11,748,991 B1* | 9/2023 | Day ..................... | B60Q 3/85 |
| | | | 348/143 |
| 2003/0181822 A1* | 9/2003 | Victor .................. | G06V 20/597 |
| | | | 600/558 |
| 2004/0005451 A1 | 1/2004 | Kretman et al. | |

(Continued)

FOREIGN PATENT DOCUMENTS

| | | |
|---|---|---|
| CN | 207123679 U | 3/2018 |
| CN | 108388048 A | 8/2018 |

(Continued)

OTHER PUBLICATIONS

"Transparent near-infrared light-emitting diodes," Phys.org, National University of Singapore, Aug. 25, 2020, 2 pages.

*Primary Examiner* — Kathleen M Walsh
(74) *Attorney, Agent, or Firm* — Frank Lollo; Brooks Kushman P.C.

(57) ABSTRACT

A vehicle system includes a display unit and a computer communicatively coupled to the camera. The display unit includes a display panel, a circuit board fixed relative to the display panel, a plurality of visible-light light emitting diodes (LEDs) mounted to the circuit board, and a plurality of infrared LEDs mounted to the circuit board and interspersed with the visible-light LEDs. The circuit board is arranged to direct emissions from the visible-light LEDs and infrared LEDs to the display panel. The computer is programmed to actuate a component based on an infrared image from a camera depicting an occupant illuminated by the infrared LEDs, and adjust a brightness of the infrared LEDs based on an ambient brightness.

18 Claims, 6 Drawing Sheets

(56) References Cited

U.S. PATENT DOCUMENTS

| | | |
|---|---|---|
| 2005/0136200 A1 | 6/2005 | Durrell et al. |
| 2008/0186701 A1* | 8/2008 | Omi ..................... G06V 40/19 |
| | | 362/231 |
| 2009/0244288 A1* | 10/2009 | Fujimoto ............... H04N 23/11 |
| | | 250/206 |
| 2010/0073584 A1 | 3/2010 | Harbach et al. |
| 2013/0050462 A1* | 2/2013 | Watanabe ......... B60R 21/01552 |
| | | 348/E7.085 |
| 2015/0035803 A1 | 2/2015 | Wassvik et al. |
| 2017/0332021 A1* | 11/2017 | Cui ....................... H04N 23/20 |
| 2018/0324367 A1 | 11/2018 | Siddiqui et al. |
| 2019/0348628 A1 | 11/2019 | Hack et al. |
| 2020/0134773 A1 | 4/2020 | Pinter et al. |
| 2020/0327323 A1* | 10/2020 | Noble ...................... G06T 7/20 |
| 2021/0173480 A1 | 6/2021 | Osterhout et al. |
| 2021/0299879 A1 | 9/2021 | Pinter et al. |
| 2021/0365702 A1* | 11/2021 | Edwards ............... G06V 10/147 |
| 2022/0365574 A1 | 11/2022 | Morskey et al. |
| 2022/0377223 A1* | 11/2022 | Noble ................... G06V 10/141 |
| 2022/0398987 A1 | 12/2022 | Wyatt |
| 2023/0137004 A1 | 5/2023 | Huizen et al. |

FOREIGN PATENT DOCUMENTS

| | | |
|---|---|---|
| CN | 110023824 A | 7/2019 |
| CN | 111679497 A | 9/2020 |
| CN | 113495378 A | 10/2021 |
| CN | 113997868 A | 2/2022 |

* cited by examiner

VEHICLE DISPLAY SYSTEM

BACKGROUND

Modern vehicles often include display screens. The display screens can be of various types suitable for displaying content legible to occupants of a vehicle, e.g., light-emitting diode (LED), organic light-emitting diode (OLED), liquid crystal display (LCD), plasma, digital light processing technology (DLPT), etc. A display screen may be mounted to the dashboard, where the display screen is visible to the occupants of the vehicle.

DETAILED DESCRIPTION

Figure 1:
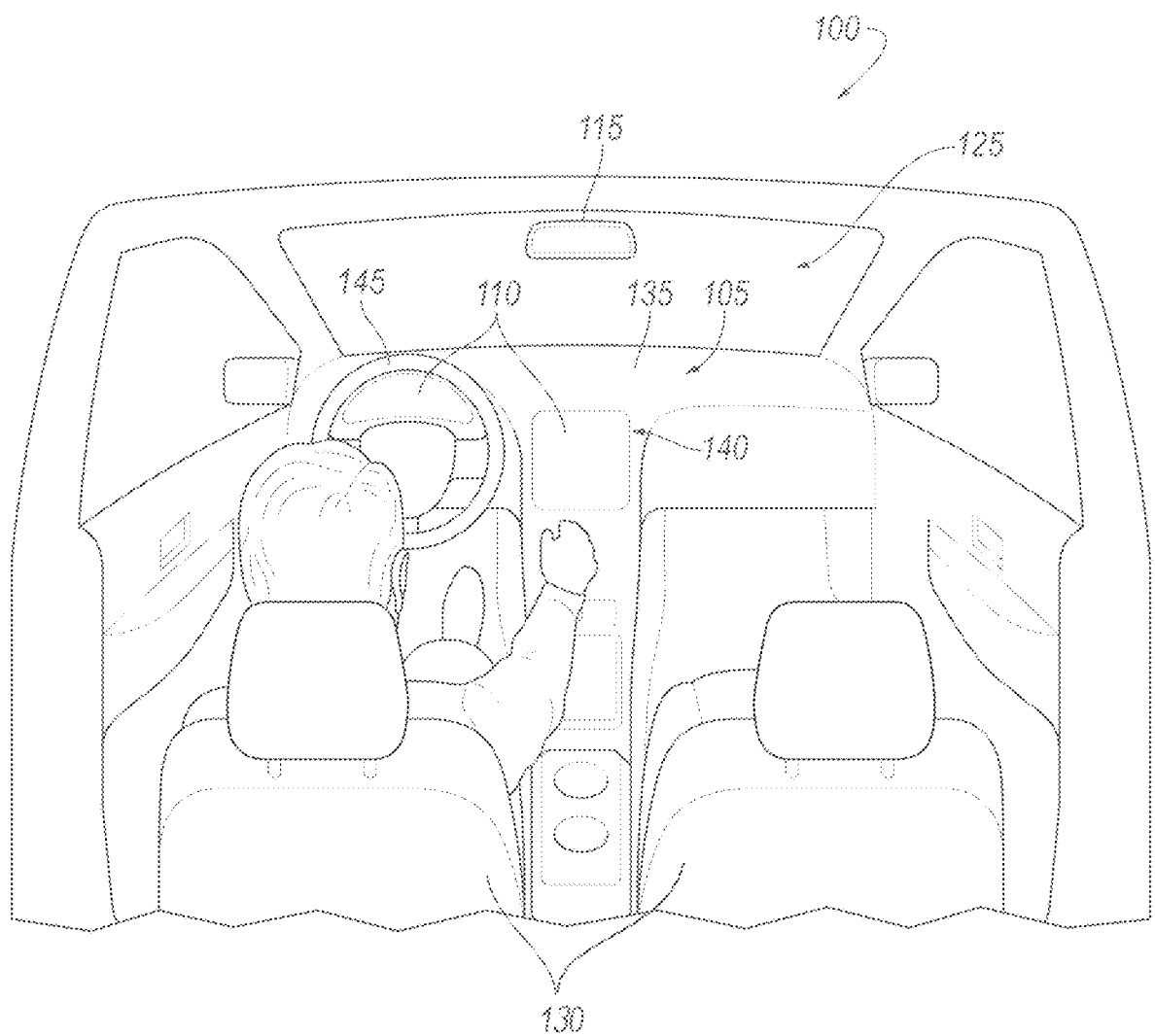
FIG. 1 is a rear perspective view of an example vehicle with a passenger compartment exposed for illustration.

This disclosure describes a vehicle system in which a display unit of a vehicle can support imaging an occupant of the vehicle. The display unit includes a plurality of visible-light light emitting diodes (LEDs) for displaying information on a display panel and a plurality of infrared LEDs for illuminating the occupant. The infrared LEDs are interspersed with the visible-light LEDs on a circuit board of the display unit. Co-locating the infrared LEDs with the visible-light LEDs can reduce power consumption, packaging space, and wiring complexity compared to having separate infrared illuminators in the passenger compartment. The location of the infrared LEDs and the spread of the infrared LEDs among the visible-light LEDs can also provide a larger, more diffuse source of infrared illumination than separate infrared illuminators, thereby providing more complete illumination of the occupant.

Illuminating the occupant with infrared illumination can support the operation of components of the vehicle, e.g., a driver-state monitoring system. The vehicle may include a camera capable of detecting infrared and a computer communicatively coupled to the camera and the infrared LEDs. The computer is programmed to actuate a component based on an infrared image from the camera depicting the occupant illuminated by the infrared LEDs, e.g., output a message to the occupant if the occupant is determined from the infrared image to be directing their attention away from the road. The computer is also programmed to adjust a brightness of the infrared LEDs based on an ambient brightness. For example, the infrared LEDs may be brighter during daytime so that the infrared image is not overexposed from daylight, and the infrared LEDs may be dimmer during nighttime to conserve energy.

A vehicle system includes a display unit and a computer communicatively coupled to the display unit. The display unit includes a display panel, a circuit board fixed relative to the display panel, a plurality of visible-light light emitting diodes (LEDs) mounted to the circuit board, and a plurality of infrared LEDs mounted to the circuit board and interspersed with the visible-light LEDs. The circuit board is arranged to direct emissions from the visible-light LEDs and infrared LEDs to the display panel. The computer is programmed to actuate a component based on an infrared image from a camera depicting an occupant illuminated by the infrared LEDs, and adjust a brightness of the infrared LEDs based on an ambient brightness.

In an example, the computer may be programmed to increase the brightness of the infrared LEDs in response to an increase of the ambient brightness.

In an example, the vehicle system may further include the camera, the camera may be configured to detect visible light and infrared light, and the computer may be programmed to actuate the component based on a visible-light image from the camera depicting the occupant.

In an example, the vehicle system may further include the camera, the camera may be configured to detect visible light and infrared light, and the computer may be programmed to, in response to the ambient brightness exceeding a threshold, actuate the component based on a visible-light image from the camera depicting the occupant. In a further example, the computer may be programmed to actuate the component based on the infrared image when the ambient brightness is below the threshold. In a yet further example, the computer may be programmed to actuate the component based on the infrared image when the ambient brightness is above the threshold.

In another further example, the computer may be programmed to, in response to the ambient brightness being below threshold, refrain from actuating the component based on the visible-light image. In a yet further example, the computer may be programmed to adjust the brightness of the infrared LEDs by changing a pulse-width modulation of the infrared LEDs.

In an example, the display unit may include a light guide plate fixed behind the display panel, and the circuit board may be arranged to direct the emissions from the visible-light LEDs and infrared LEDs into the light guide plate at an edge of the light guide plate. In a further example, the visible-light LEDs and infrared LEDs may be arranged in a row along the edge of the light guide plate.

In an example, a number of the visible-light LEDs may be greater than a number of the infrared LEDs.

In an example, the circuit board may be fixed behind the display panel and arranged parallel to the display panel. In a further example, the display unit may include a plurality of optical domes enclosing the respective visible-light LEDs, and the infrared LEDs may be enclosed in respective ones of the optical domes. In a yet further example, a subset of the optical domes may enclose the respective infrared LEDs.

In another further example, the visible-light LEDs and infrared LEDs may be arranged in a two-dimensional pattern on the circuit board.

In an example, the vehicle system may further include a dashboard, and the display unit may be mounted to the dashboard.

In an example, the vehicle system may further include the camera, and the camera may be spaced from the display unit.

A display unit includes a display panel, a light guide plate fixed behind the display panel, a circuit board fixed relative to the display panel, a plurality of visible-light light emitting diodes (LEDs) mounted to the circuit board, and a plurality of infrared LEDs mounted to the circuit board and interspersed with the visible-light LEDs. The circuit board may be arranged to direct emissions from the visible-light LEDs and infrared LEDs into the light guide plate at an edge of the light guide plate.

In an example, the visible-light LEDs and infrared LEDs may be arranged in a row along the edge of the light guide plate.

In an example, a number of the visible-light LEDs may be greater than a number of the infrared LEDs.

With reference to the Figures, wherein like numerals indicate like parts throughout the several views, a vehicle system 105 of a vehicle 100 includes a display unit 110 and a computer 600 communicatively coupled to the display unit 110. The display unit 110 includes a display panel 205, a circuit board 210 fixed relative to the display panel 205, a plurality of visible-light light emitting diodes (LEDs) 215 mounted to the circuit board 210, and a plurality of infrared LEDs 220 mounted to the circuit board 210 and interspersed with the visible-light LEDs 215. The circuit board 210 is arranged to direct emissions from the visible-light LEDs 215 and infrared LEDs 220 to the display panel 205. The computer 600 is programmed to actuate a component based on an infrared image from a camera 115 depicting an occupant illuminated by the infrared LEDs 220, and adjust a brightness of the infrared LEDs 220 based on an ambient brightness.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a passenger compartment 125 to house occupants, if any, of the vehicle 100. The passenger compartment 125 may include a plurality of seats 130. One or more of the seats 130 may be disposed in a front row of the passenger compartment 125, and one or more of the seats 130 may be disposed in a second row behind the front row. The passenger compartment 125 may also include seats 130 in a third row (not shown) at a rear of the passenger compartment 125. The seats 130 are shown to be bucket seats in the front row and bench seats in the second row, but the seats 130 may be other types. The position and orientation of the seats 130 and components thereof may be adjustable by an occupant. Each seat 130 may define a respective occupant seating area 120, i.e., a space that is or would be occupied by an occupant sitting in the seat 130.

The passenger compartment 125 includes a dashboard 135. The dashboard 135 may be disposed at a forward end of the passenger compartment 125 and face toward the front seats 130. The dashboard 135 may include vehicle controls, such as a steering wheel 145; gauges, dials, and information displays; heating and ventilation equipment; a radio and other electronics; etc.

The vehicle 100 includes a user interface 140. The user interface 140 presents information to and receives information from an operator of the vehicle 100. The user interface 140 may include dials, digital readouts, screens such as the display unit 110, speakers, and so on for providing information to the operator, e.g., human-machine interface (HMI) elements such as are known. The user interface 140 may include buttons, knobs, keypads, microphone, and so on for receiving information from the operator. Components of the user interface 140 may be mounted to the dashboard 135 or to other locations in the passenger compartment 125.

The user interface 140 includes the display unit 110. The display unit 110 is mounted to the dashboard 135. The display unit 110 may be positioned to be visible to an operator of the vehicle 100 while the head of the operator is facing forward in the direction of travel of the vehicle 100, meaning that the operator may be able to view the display unit 110 by moving their eyes without moving their head. The display unit 110 may also be positioned to illuminate an occupant, e.g., the operator, of the vehicle 100 with the infrared LEDs 220, which are described below. For example, the display unit 110 may be positioned upward and forward from the steering wheel 145, e.g., to serve as an instrument panel. For another example, the display unit 110 may be positioned on a center stack of the dashboard 135 and be visible to the operator as well as other occupants.

The display unit 110 may convey information to the occupant. For example, the display unit 110 may display information about operation of the vehicle such as speed, engine revolutions per minute, engine temperature, fuel or battery level, etc.; passenger compartment statuses such as open doors, seat positions, climate-control settings, etc.; infotainment information such as radio station, media source, volume, connections to user devices, etc.; and other information.

The camera 115 can detect electromagnetic radiation in some range of wavelengths. For example, the camera 115 may be configured to detect both visible light and infrared radiation. For example, the camera 115 can be a charge-coupled device (CCD), complementary metal oxide semiconductor (CMOS), or any other suitable type.

The camera 115 is arranged such that a field of view of the camera 115 encompasses at least one of the occupant seating areas 120, e.g., the occupant seating area 120 for the operator of the vehicle 100, i.e., the occupant seating area 120 defined by the seat 130 directly behind the steering wheel 145. The camera 115 may be spaced from the display unit 110. For example, the camera 115 may be mounted to a rear-view mirror, be mounted to the dashboard 135 at the center stack, or be positioned at a left or right lateral end of the dashboard 135 below a front pillar of the vehicle 100.

Figure 2:
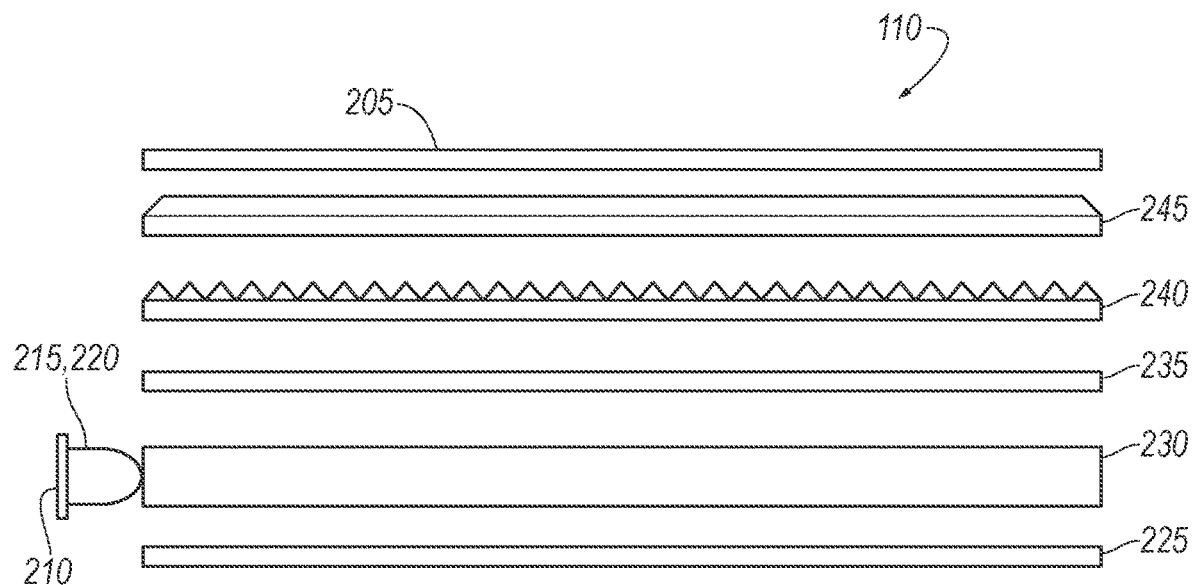
FIG. 2 is a diagrammatic exploded side cross-sectional view of an example display unit of the vehicle.
Figure 3:
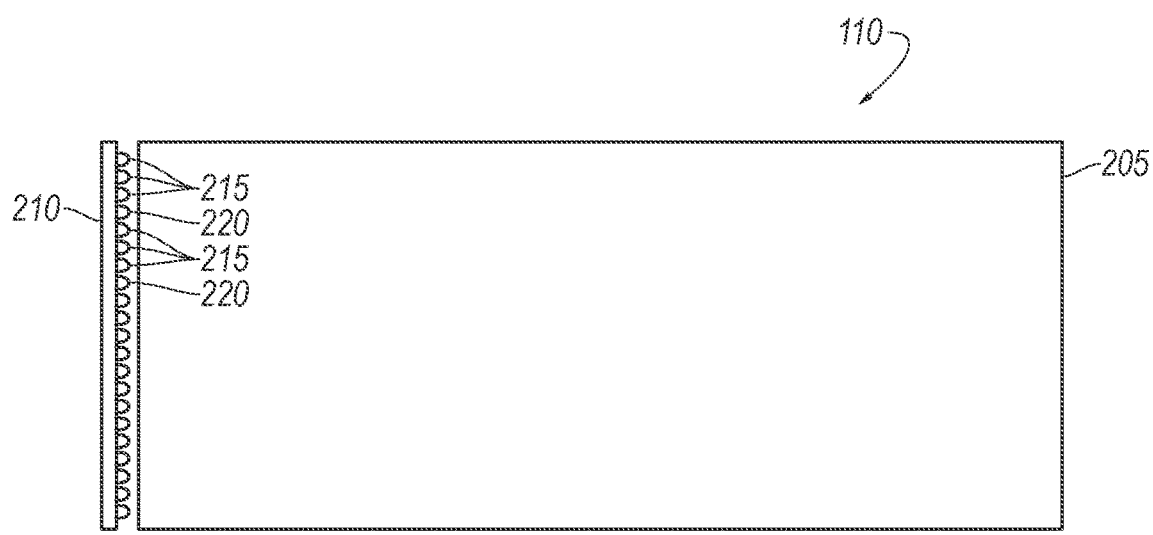
FIG. 3 is a diagrammatic plan view of the display unit of FIG. 2.
Figure 4:
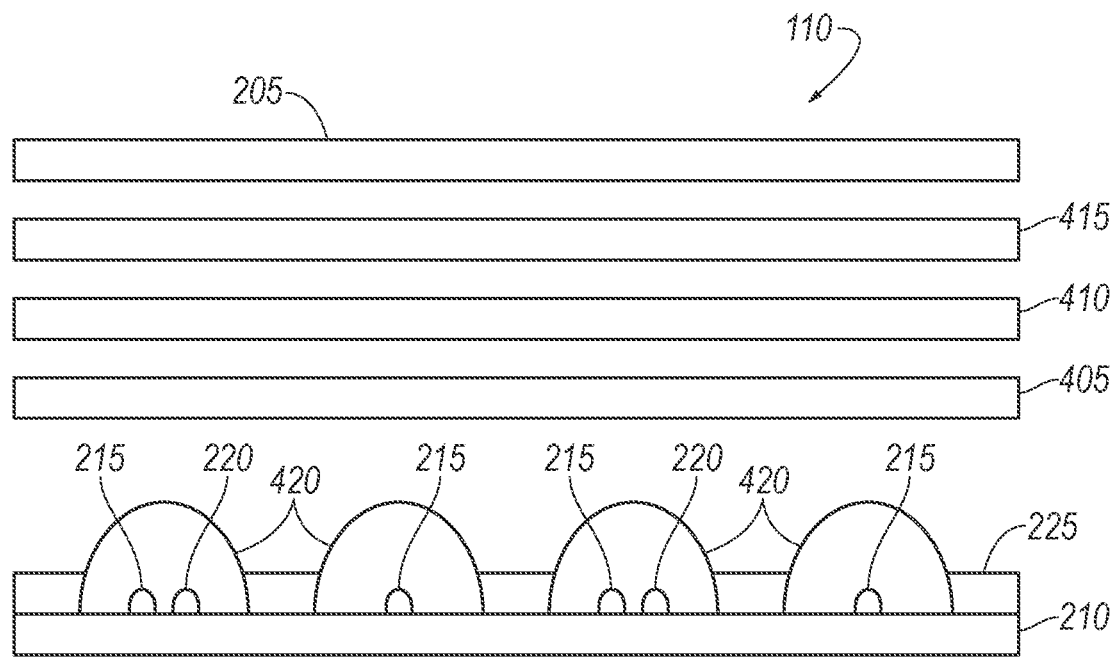
FIG. 4 is a diagrammatic exploded side cross-sectional view of another example display unit of the vehicle.

With reference to FIGS. 2-5, as a general overview of the display unit 110, the display unit 110 includes the circuit board 210, the visible-light LEDs 215, the infrared LEDs 220, a reflector 225, the display panel 205, and other layers. (For clarity, only some of the visible-light LEDs 215 and infrared LEDs 220 are labeled.) The components of the display unit 110 may be fixed relative to each other and fixed relative to the dashboard 135; i.e., the display unit 110 may lack moving parts. FIGS. 2-3 show an example of an edge-lit arrangement of the visible-light LEDs 215 and infrared LEDs 220, and FIGS. 4-5 show an example of a direct-backlit arrangement of the visible-light LEDs 215 and infrared LEDs 220. Generally and in both examples, the other layers may be sandwiched between the reflector 225 and the display panel 205. Generally and in both examples, the visible-light LEDs 215 and infrared LEDs 220 are mounted to the circuit board 210, the infrared LEDs 220 are interspersed with the visible-light LEDs 215, and the circuit board 210 is arranged to direct emissions from the visible-light LEDs 215 and infrared LEDs 220 to the display panel 205.

The circuit board 210 acts as a substrate for physically mounting and electrically connecting the visible-light LEDs 215 and infrared LEDs 220. The circuit board 210 may be rigid. The circuit board 210 may have a generally flat shape, e.g., rectangular. The circuit board 210 may include a plurality of electric connections to the respective visible-light LEDs 215 and infrared LEDs 220, so that the visible-light LEDs 215 and infrared LEDs 220 may be independently controlled.

Each LED 215, 220 is a semiconductor device that emits electromagnetic radiation when electrical current flows through it, via the phenomenon of electroluminescence. Each LED 215, 220 includes a leadframe with an anvil and post (not shown). The leadframe is connected to anode and cathode pins. The anvil includes a semiconductor die that produces the electromagnetic radiation inside a reflective cavity. The leadframe may be housed in an epoxy lens or case. Each LED 215, 220 may emit electromagnetic radiation at a wavelength defined by the construction and/or material of the semiconductor die. The visible-light LEDs 215 may include multiple wavelengths, e.g., red visible-light LEDs 215, green visible-light LEDs 215, and blue visible-light LEDs 215 arranged in a regular pattern over the circuit board 210. The infrared LEDs 220 may have a wavelength in the near infrared spectrum, e.g., 940 nanometers. The number of visible-light LEDs 215 may be greater than the number of infrared LEDs 220. This relative proportion can allow the visible-light LEDs 215 to have a sufficient density to fill the available space of the display panel 205 while the infrared LEDs 220 can still produce enough infrared radiation to illuminate the occupant for the camera 115.

The display panel 205 may be an outermost rigid layer of the display unit 110, e.g., may be the outermost layer or may have one or more films on it. The display panel 205 may have a generally flat shape, e.g., rectangular. The display panel 205 is transparent to the wavelengths of electromagnetic radiation emitted by the visible-light LEDs 215 and infrared LEDs 220, e.g., the display panel 205 may be polycarbonate. The display panel 205 may protect the interior components of the display unit 110 from the surrounding environment.

With reference to FIGS. 2-3, the display unit 110 may have an edge-lit arrangement. As shown in FIG. 2, the display unit 110 may include a stack of layers sandwiched together, e.g., in a direction from inside the dashboard 135 to outside the dashboard 135: the reflector 225, a light guide plate 230, a diffuser film 235, a vertical prism film 240, a horizontal prism film 245, and the display panel 205. In other words, the reflector 225, the light guide plate 230, the diffuser film 235, the vertical prism film 240, and the horizontal prism film 245 are fixed behind the display panel 205. The layers may have rectangular shapes with approximately the same length and width (but not necessarily thickness), and the rectangular shapes may be aligned with each other. The layers are parallel with each other and abut each other. The circuit board 210 is outside the stack of layers, i.e., is not one of the layers of the stack.

With continued reference to FIG. 2, the circuit board 210 is fixed relative to the display panel 205 and the other layers of the stack, and the circuit board 210 is arranged to direct emissions from the visible-light LEDs 215 and infrared LEDs 220 to the display panel 205. Specifically, the circuit board 210 is arranged to direct the emissions from the visible-light LEDs 215 and infrared LEDs 220 into the light guide plate 230 at an edge of the light guide plate 230. The visible-light LEDs 215 and infrared LEDs 220 are arranged on the circuit board 210 along the edge of the light guide plate 230. The light guide plate 230 is configured to reflect the visible light and infrared radiation from the edge where the circuit board 210 is attached along the full length or width of the light guide plate 230 to the opposite edge. For example, the light guide plate 230 may be made of poly(methyl methacrylate) (PMMA).

With reference to FIG. 3, the visible-light LEDs 215 and infrared LEDs 220 are arranged in a row along the edge of the light guide plate 230. The infrared LEDs 220 are interspersed with the visible-light LEDs 215 along the row. For example, the visible-light LEDs 215 and infrared LEDs 220 may be arranged in a repeating linear pattern, e.g., alternating between three visible-light LEDs 215 and one infrared LED 220.

Figure 5A:
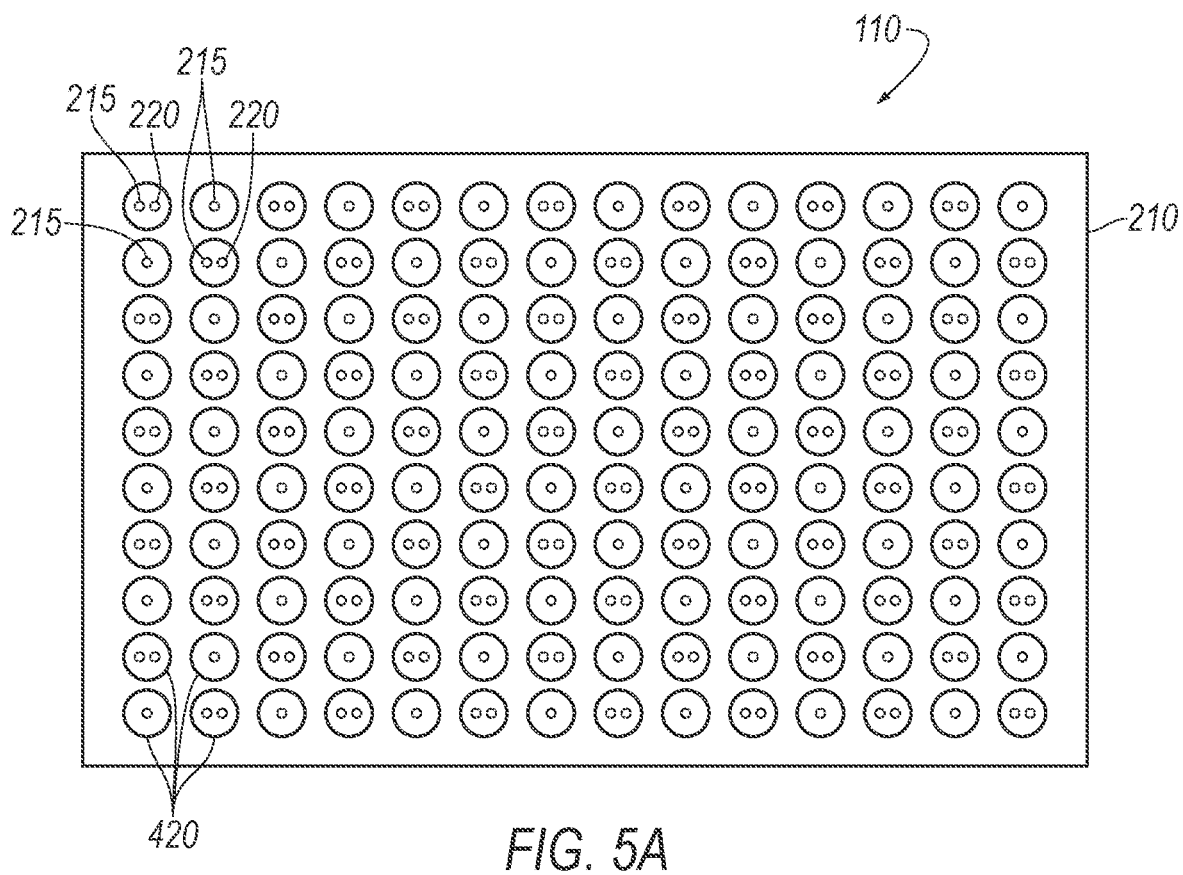
FIG. 5A is a diagrammatic plan view of an example display unit consistent with FIG. 4.
Figure 5B:
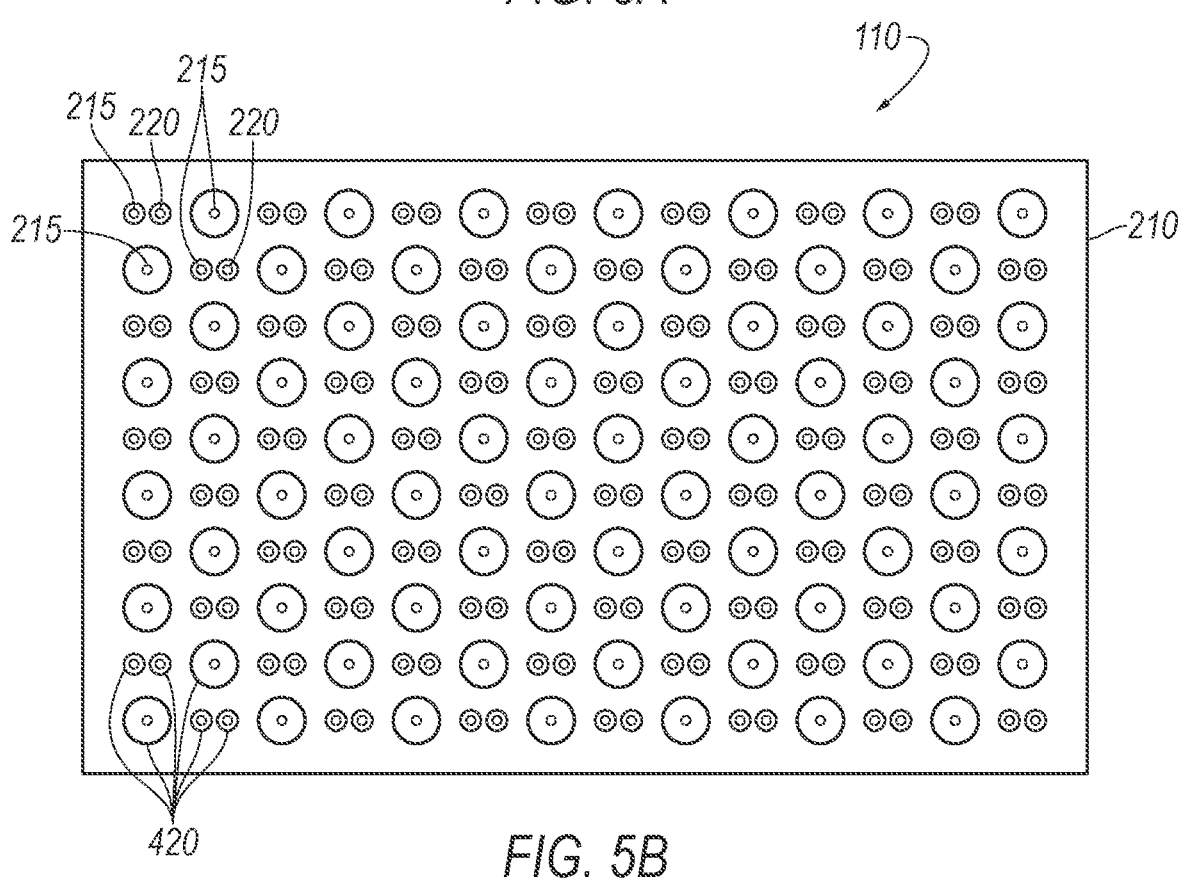
FIG. 5B is a diagrammatic plan view of another example display unit consistent with FIG. 4.

With reference to FIGS. 4-5B, the display unit 110 may have a direct backlit arrangement. As shown in FIG. 4, the display unit 110 may include a stack of layers sandwiched together, e.g., in a direction from inside the dashboard 135 to outside the dashboard 135: the circuit board 210, the reflector 225, a diffuser 405, a diffuser sheet 410, a prism 415, and the display panel 205. In other words, the circuit board 210, the reflector 225, the diffuser 405, the diffuser sheet 410, and the prism 415 are fixed behind the display panel 205. The layers, including the circuit board 210, may have rectangular shapes with approximately the same length and width (but not necessarily thickness), and the rectangular shapes may be aligned with each other. The layers are parallel with each other and abut each other.

With continued reference to FIG. 4, the circuit board 210 is fixed relative to the display panel 205 and the other layers of the stack, and the circuit board 210 is arranged to direct emissions from the visible-light LEDs 215 and infrared LEDs 220 to the display panel 205. Specifically, the circuit board 210 is fixed behind the display panel 205 and arranged parallel to the display panel 205. The visible-light LEDs 215 and infrared LEDs 220 are mounted to the side of the circuit board 210 facing toward the display panel 205 and are aimed perpendicular to the circuit board 210 and the display panel 205.

With reference to FIGS. 5A-B, the visible-light LEDs 215 and infrared LEDs 220 may be arranged in a two-dimensional pattern on the circuit board 210. The infrared LEDs 220 are interspersed with the visible-light LEDs 215 along the length and width of the circuit board 210. For example, the visible-light LEDs 215 and infrared LEDs 220 may be arranged in a repeating two-dimensional pattern, e.g., the visible-light LEDs 215 in a grid with one infrared LED 220 adjacent to every other visible-light LED 215 along the length and along the width of the circuit board 210, as shown in FIG. 5.

Returning to FIG. 4, the display unit 110 may include a plurality of optical domes 420 enclosing the respective visible-light LEDs 215. The optical domes 420 may be mounted to the circuit board 210 or the reflector 225 above the visible-light LEDs 215 and infrared LEDs 220. The optical domes 420 may be transparent with respect to the wavelengths of electromagnetic radiation emitted by the visible-light LEDs 215 and infrared LEDs 220. The optical domes 420 may protect the LEDs 215, 220 and may spread and guide the light emitted by the visible-light LEDs 215 for complete coverage of the display panel 205.

With reference to FIG. 5A, each optical dome 420 may enclose one of the visible-light LEDs 215, and each visible-light LED 215 may be housed in one of the optical domes 420; i.e., the visible-light LEDs 215 and the optical domes 420 may have a one-to-one relationship. The infrared LEDs 220 may also be enclosed in respective ones of the optical domes 420 alongside the visible-light LEDs 215. For example, a subset of the optical domes 420 may enclose the respective infrared LEDs 220. In other words, some of the optical domes 420 enclose one visible-light LED 215 and one infrared LED 220 each, and the remaining optical domes 420 enclose one visible-light LED 215 each and no infrared LEDs 220.

Alternatively, with reference to FIG. 5B, each optical dome 420 may enclose a single LED 215, 220, i.e., either a visible-light LED 215 or an infrared LED 220. The visible-light LEDs 215 and the optical domes 420 housing the visible-light LEDs 215 may be arranged in a two-dimensional pattern such as a rectangular grid, and the infrared LEDs 220 and the optical domes 420 housing the infrared LEDs 220 may be positioned adjacent to respective visible-light LEDs 215 in the same slots of the two-dimensional pattern as those visible-light LEDs 215.

Figure 6:
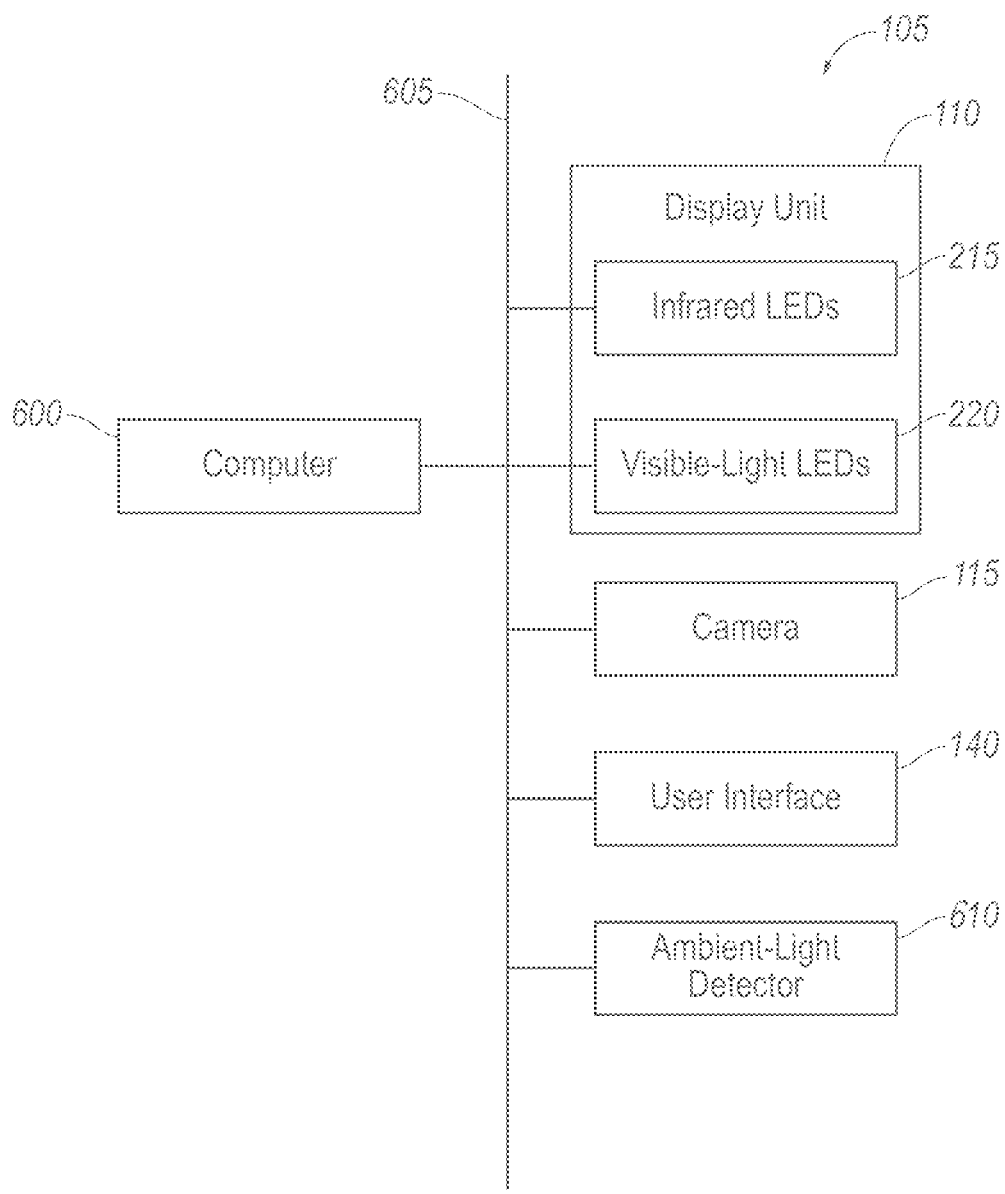
FIG. 6 is a block diagram of an example control system of the vehicle.

With reference to FIG. 6, the vehicle system 105 includes the computer 600 on board the vehicle 100. The computer 600 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 600 can thus include a processor, a memory, etc. The memory of the computer 600 can include media for storing instructions executable by the processor as well as for electronically storing data and/or databases, and/or the computer 600 can include structures such as the foregoing by which programming is provided. The computer 600 can be multiple computers coupled together.

The vehicle system 105 may include a communications network 605. The computer 600 may transmit and receive data through the communications network 605. The communications network 605 may be, e.g., a controller area network (CAN) bus, Ethernet, WiFi, Local Interconnect Network (LIN), onboard diagnostics connector (OBD-II), and/or any other wired or wireless communications network. The computer 600 may be communicatively coupled to the visible-light LEDs 215 and infrared LEDs 220 of the display unit 110, the camera 115, the user interface 140, an ambient-light sensor 610, and other components via the communications network 605.

The vehicle system 105 may include the ambient-light sensor 610. The ambient-light sensor 610 is a photodetector that detects an amount of ambient light present, i.e., a total light level from sources in the environment. The ambient-light sensor 610 may be any suitable type, e.g., phototransistor, photodiode, photonic integrated circuit, etc.

The computer 600 is programmed to receive visible-light images from the camera 115. The visible-light images are of the field of view of the camera 115, and the visible-light images depict the occupant in the occupant seating area 120. Each visible-light image is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in a visible-light image, i.e., position in the field of view of the camera 115 at the time that the visible-light image was recorded, can be specified in pixel dimensions or coordinates, e.g., an ordered pair of pixel distances, such as a number of pixels from a top edge and a number of pixels from a left edge of the visible-light image.

The computer 600 is programmed to receive infrared images from the camera 115. The infrared images are of the field of view of the camera 115, and the infrared images depict the occupant in the occupant seating area 120 illuminated by the infrared LEDs 220. Each infrared image is a two-dimensional matrix of pixels. Each pixel has a brightness in the infrared wavelength represented as a numerical value, e.g., a scalar unitless value of light intensity in the infrared wavelength between 0 (black) and 1 (white), or a value on an 8-bit scale (0 to 255) or a 12- or 16-bit scale. Position in an infrared image, i.e., position in the field of view of the camera 115 at the time that the infrared image was recorded, can be specified in pixel dimensions or coordinates, e.g., an ordered pair of pixel distances, such as a number of pixels from a top edge and a number of pixels from a left edge of the infrared image.

The computer 600 is programmed to adjust a brightness of the infrared LEDs 220. The computer 600 may control the brightness of the infrared LEDs 220 by changing a pulse-width modulation of the infrared LEDs 220; i.e., the computer 600 may increase the brightness by increasing a proportion of the time that an infrared LED 220 is switched on, thereby increasing the average current that the infrared LED 220 receives, and the computer 600 may decrease the brightness by decreasing the proportion of the time that the infrared LED 220 is switched on, thereby decreasing the average current that the infrared LED 220 receives. With pulse-width modulation, the average current can be changed even while the voltage across the infrared LED 220 is constant.

The computer 600 is programmed to adjust the brightness of the infrared LEDs 220 based on an ambient brightness. The computer 600 may receive the ambient brightness from the ambient-light sensor 610. The computer 600 may increase the brightness of the infrared LEDs 220 in response to an increase of the ambient brightness, and decrease the brightness of the infrared LEDs 220 in response to a decrease of the ambient brightness. In other words, the ambient brightness and the brightness of the infrared LED 220 may have a positive relationship. For example, the brightness of the infrared LEDs 220 may be a mathematical function of the ambient brightness, i.e., $I_{inf}=f(I_{amb})$, in which $I_{inf}$ is the brightness of the infrared LEDs 220 and $I_{amb}$ is the ambient brightness, e.g., a positive linear relationship, i.e., $I_{inf}=mI_{amb}$, in which m is a slope chosen experimentally such that the infrared images have high contrast at different ambient brightnesses. For another example, the brightness of the infrared LED 220 may be chosen from a number of preset brightnesses, e.g., two, based on the ambient brightness. In the example of two preset brightnesses, the computer 600 may select the greater preset brightness in response to the ambient brightness being greater than a threshold, and the computer 600 may select the lesser preset brightness in response to the ambient brightness being less than the threshold. The threshold may be chosen to correspond to the transition between daytime and nighttime.

The computer 600 may be programmed to determine a state of the occupant based on the visible-light image or the infrared image. The state may be a categorization of the apparent alertness of the occupant, e.g., attention on road, attention elsewhere, no discernable attention, etc. The computer 600 can identify the state of the occupant using conventional image-recognition techniques, e.g., a convolutional neural network programmed to accept images of occupants as input and output an identified state. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential state of the occupant, and the final output is the state with the highest score.

The computer 600 is programmed to actuate a component based on the visible-light image or the infrared image from the camera 115 depicting the occupant. For example, the computer 600 may output a message to the occupant based on the visible-light image or the infrared image from the camera 115 depicting the occupant. The computer 600 may output the message in response to the state of the occupant being in a first set of states, e.g., attention elsewhere or no discernable attention, as determined from the visible-light image or the infrared image. The possible states of the occupant may be sorted into one of the first set or a second set, with the first set containing the possible states for which the message should be outputted and the second set containing the possible states for which the message should not be outputted. If the computer 600 determines different states of the occupant from the visible-light image and the infrared image, then the computer 600 may output the message in response to at least one of the determined states being in the first set of states (e.g., attention elsewhere or no discernable attention), even if the other determined state is in the second set of states (e.g., attention on road). The computer 600 may instruct the user interface 140 to output the message. The message may be visual, audible, and/or haptic. As one example, the message may be a chime and text displayed on the display unit 110 or another screen of the user interface 140. For another example, the computer 600 may determine an eye gaze direction of the occupant based on the visible-light image or the infrared image from the camera 115 depicting the occupant, e.g., by executing a machine-learning program that is trained to recognize eye gaze direction and that takes the visible-light image or the infrared image as input. The location of the eye gaze on the user interface 140 or display unit 110 may be treated as an input supplied by the occupant for controlling a component of the vehicle 100.

The computer 600 may be programmed to actuate the component, e.g., output the message, based on either the visible-light image or the infrared image according to the ambient brightness, e.g., based on the visible-light image in response to the ambient brightness being above a threshold and based on the infrared image when the ambient brightness is below the threshold. For example, the computer 600 may be programmed to output the message to the occupant based on the infrared image when the ambient brightness is below the threshold and when the ambient brightness is below the threshold, and the computer 600 may be programmed to output the message based on the visible-light image in response to the ambient brightness exceeding the threshold and refrain from outputting the message to the occupant based on the visible-light image in response to the ambient brightness being below threshold. In other words, when the ambient brightness is above the threshold, the computer 600 can rely on either the visible-light image or the infrared image for determining the state of the occupant and outputting the message in response to the state being in the first set, and when the ambient brightness is below the threshold, the computer 600 relies on only the infrared image and not the visible-light image for determining the state of the occupant and outputting the message in response to the state being in the first set. Thus, the infrared image provides data for determining the state of the occupant when the ambient light is too dim to use a visible-light image, and the infrared image provides additional data when the visible-light image is available.

Figure 7:
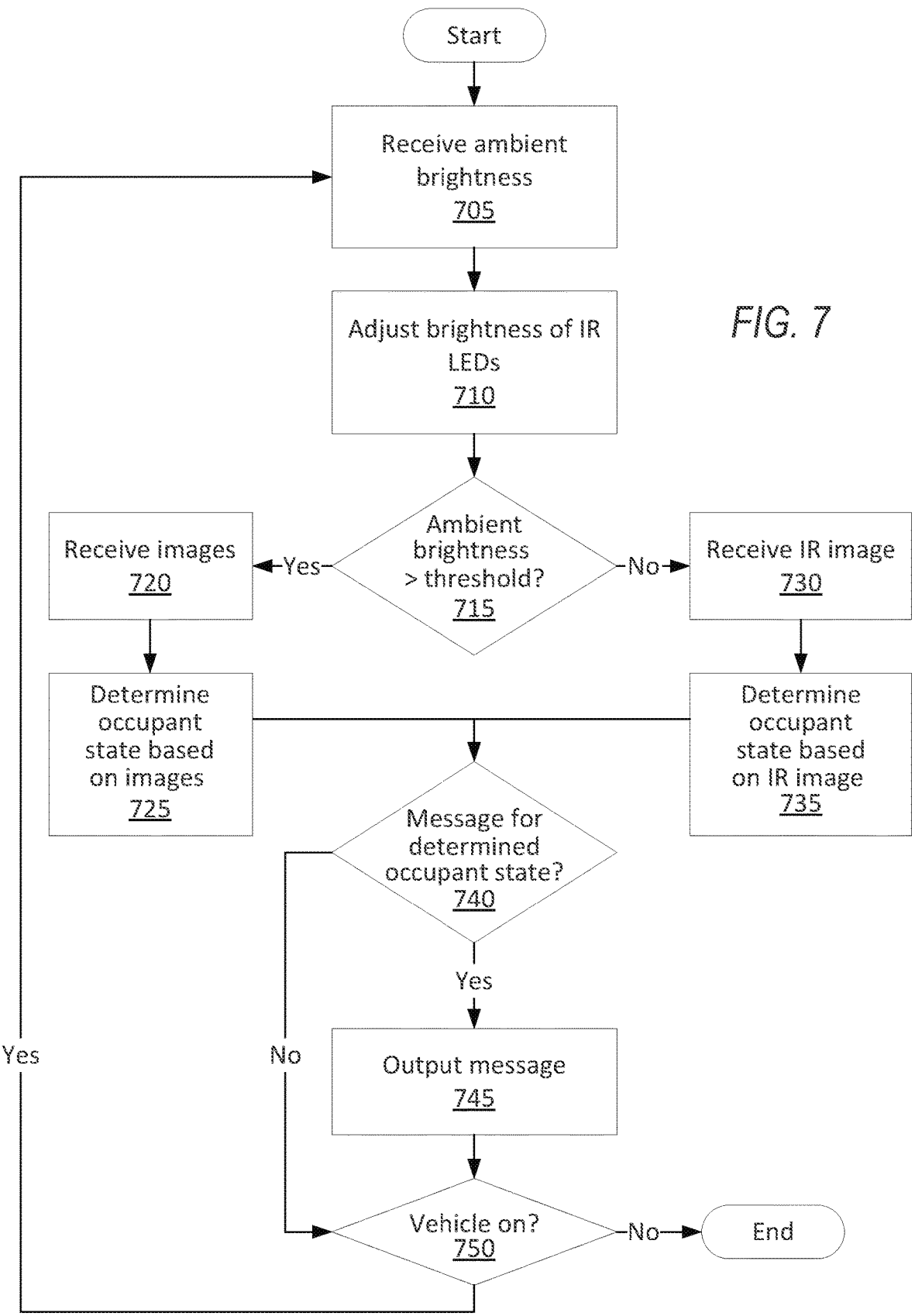
FIG. 7 is a flowchart of an example process for determining when to output a message to an occupant of the vehicle.

FIG. 7 is a flowchart illustrating an example process 700 for determining when to output the message to the occupant. The memory of the computer 600 stores executable instructions for performing the steps of the process 700 and/or programming can be implemented in structures such as mentioned above. As a general overview of the process 700, the computer 600 receives the ambient brightness and adjusts the brightness of the infrared LEDs 220 based on the ambient brightness. In response to the ambient brightness exceeding the threshold, the computer 600 receives the visible-light image and the infrared image and determines the state of the occupant from the images. In response to the ambient brightness being below the threshold, the computer 600 receives the infrared image and determines the state of the occupant from the infrared image. In response to the determined state being in the first set of states, the computer 600 outputs the message to the occupant. The process 700 continues for as long as the vehicle 100 remains on.

The process 700 begins in a block 705, in which the computer 600 receives the ambient brightness from the ambient-light sensor 610 via the communications network 605, as described above.

Next, in a block 710, the computer 600 adjusts the brightness of the infrared LEDs 220 based on the ambient brightness, as described above.

Next, in a decision block 715, the computer 600 determines whether the ambient brightness exceeds the threshold. In response to the ambient brightness exceeding the threshold, the process 700 proceeds to a block 720. In response to the ambient brightness being below the threshold, the process 700 proceeds to a block 730.

In the block 720, the computer 600 receives the visible-light image and the infrared image from the camera 115 via the communications network 605, as described above.

Next, in a block 725, the computer 600 determines the state of the occupant based on the visible-light image and infrared image, as described above. After the block 725, the process 700 proceeds to a decision block 740.

In the block 730, the computer 600 receives the infrared image from the camera 115 via the communications network 605, as described above.

Next, in a block 735, the computer 600 determines the state of the occupant based on the infrared image, as described above. After the block 735, the process 700 proceeds to the decision block 740.

In the decision block 740, the computer 600 determines whether the determined state of the occupant is in the first set of states, as described above. In response to the determined state being in the first set of states, the process 700 proceeds to a block 745. In response to the determined state being in the second set of states, the process 700 proceeds to a decision block 750.

In the block 745, the computer 600 outputs the message to the occupant by instructing the user interface 140, via the communications network 605, to output the message, as described above. After the block 745, the process 700 proceeds to the decision block 750.

In the decision block 750, the computer 600 determines whether the vehicle 100 is still on. In response to the vehicle 100 still being on, the process 700 returns to the block 705 to continue evaluating the state of the occupant. In response to the vehicle 100 turning off, the process 700 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A vehicle system comprising:
   a display unit including:
   a display panel;
   a circuit board fixed relative to the display panel, wherein the circuit board is fixed behind the display panel and arranged parallel to the display panel;
   a plurality of visible-light light emitting diodes (LEDs) mounted to the circuit board; and
   a plurality of infrared LEDs mounted to the circuit board and interspersed with the visible-light LEDs;
   the circuit board being arranged to direct emissions from the visible-light LEDs and infrared LEDs to the display panel;
   the visible-light LEDs and infrared LEDs being arranged in a two-dimensional pattern on the circuit board; and
   a computer communicatively coupled to the display unit;

the computer programmed to:
  actuate a component based on an infrared image from a camera depicting an occupant illuminated by the infrared LEDs; and
  adjust a brightness of the infrared LEDs based on an ambient brightness.

2. The vehicle system of claim 1, wherein the computer is programmed to increase the brightness of the infrared LEDs in response to an increase of the ambient brightness.

3. The vehicle system of claim 1, further comprising the camera, wherein:
  the camera is configured to detect visible light and infrared light; and
  the computer is programmed to actuate the component based on a visible-light image from the camera depicting the occupant.

4. The vehicle system of claim 1, further comprising the camera, wherein:
  the camera is configured to detect visible light and infrared light; and
  the computer is programmed to, in response to the ambient brightness exceeding a threshold, actuate the component based on a visible-light image from the camera depicting the occupant.

5. The vehicle system of claim 4, wherein the computer is programmed to actuate the component based on the infrared image when the ambient brightness is below the threshold.

6. The vehicle system of claim 5, wherein the computer is programmed to actuate the component based on the infrared image when the ambient brightness is above the threshold.

7. The vehicle system of claim 4, wherein the computer is programmed to, in response to the ambient brightness being below the threshold, refrain from actuating the component based on the visible-light image.

8. The vehicle system of claim 7, wherein the computer is programmed to adjust the brightness of the infrared LEDs by changing a pulse-width modulation of the infrared LEDs.

9. The vehicle system of claim 1, wherein:
  the display unit includes a light guide plate fixed behind the display panel; and
  the circuit board is arranged to direct the emissions from the visible-light LEDs and infrared LEDs into the light guide plate at an edge of the light guide plate.

10. The vehicle system of claim 9, wherein the visible-light LEDs and infrared LEDs are arranged in a row along the edge of the light guide plate.

11. The vehicle system of claim 1, wherein a number of the visible-light LEDs is greater than a number of the infrared LEDs.

12. The vehicle system of claim 1, wherein the display unit includes a plurality of optical domes enclosing the respective visible-light LEDs, and the infrared LEDs are enclosed in respective ones of the optical domes.

13. The vehicle system of claim 12, wherein a subset of the optical domes enclose the respective infrared LEDs.

14. The vehicle system of claim 1, further comprising a dashboard, the display unit being mounted to the dashboard.

15. The vehicle system of claim 1, further comprising the camera, wherein the camera is spaced from the display unit.

16. A vehicle system comprising:
a display unit including:
  a display panel;
  a circuit board fixed relative to the display panel;
  a plurality of visible-light light emitting diodes (LEDs) mounted to the circuit board; and
  a plurality of infrared LEDs mounted to the circuit board and interspersed with the visible-light LEDs;
  the circuit board being arranged to direct emissions from the visible-light LEDs and infrared LEDs to the display panel;
a computer communicatively coupled to the display unit; and
a camera, the camera being configured to detect visible light and infrared light;
the computer programmed to:
  actuate a component based on an infrared image from the camera depicting an occupant illuminated by the infrared LEDs;
  in response to the ambient brightness exceeding a threshold, actuate the component based on a visible-light image from the camera depicting the occupant;
  adjust a brightness of the infrared LEDs based on an ambient brightness; and
  actuate the component based on the infrared image when the ambient brightness is below the threshold.

17. A vehicle system comprising:
a display unit including:
  a display panel;
  a circuit board fixed relative to the display panel;
  a plurality of visible-light light emitting diodes (LEDs) mounted to the circuit board; and
  a plurality of infrared LEDs mounted to the circuit board and interspersed with the visible-light LEDs;
  the circuit board being arranged to direct emissions from the visible-light LEDs and infrared LEDs to the display panel;
a computer communicatively coupled to the display unit; and
a camera, the camera being configured to detect visible light and infrared light;
the computer programmed to:
  actuate a component based on an infrared image from the camera depicting an occupant illuminated by the infrared LEDs;
  in response to the ambient brightness exceeding a threshold, actuate the component based on a visible-light image from the camera depicting the occupant;
  adjust a brightness of the infrared LEDs based on an ambient brightness; and
  in response to the ambient brightness being below the threshold, refrain from actuating the component based on the visible-light image.

18. A vehicle system comprising:
a display unit including:
  a display panel;
  a circuit board fixed relative to the display panel, wherein the circuit board is fixed behind the display panel and arranged parallel to the display panel;
  a plurality of visible-light light emitting diodes (LEDs) mounted to the circuit board;
  a plurality of infrared LEDs mounted to the circuit board and interspersed with the visible-light LEDs; and
  a plurality of optical domes enclosing the respective visible-light LEDs, wherein the infrared LEDs are enclosed in respective ones of the optical domes;
  the circuit board being arranged to direct emissions from the visible-light LEDs and infrared LEDs to the display panel; and
a computer communicatively coupled to the display unit;
the computer programmed to:
  actuate a component based on an infrared image from a camera depicting an occupant illuminated by the infrared LEDs; and adjust a brightness of the infrared LEDs based on an ambient brightness.

\* \* \* \* \*